Feb. 12, 1924.
S. H. HOLMES
1,483,728
LOCALITY INDICATOR FOR VEHICLES
Filed Oct. 6, 1921
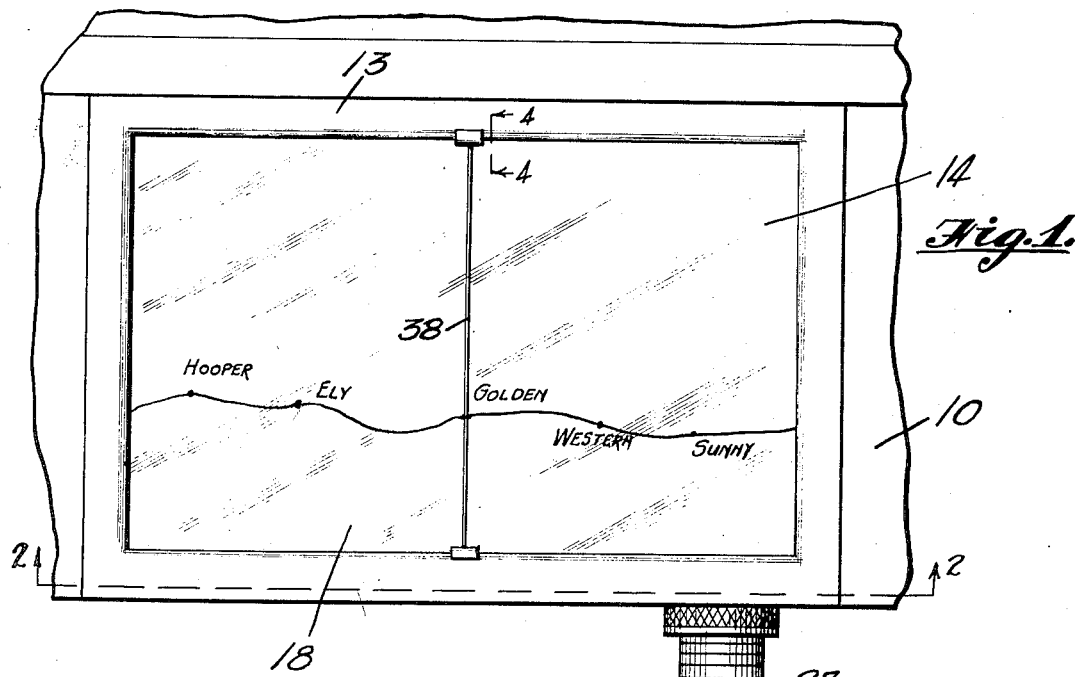
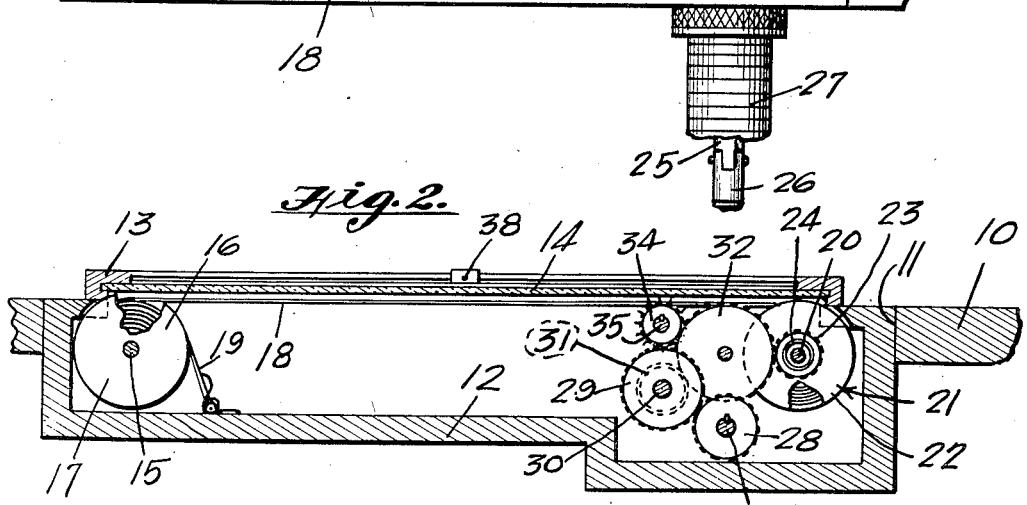
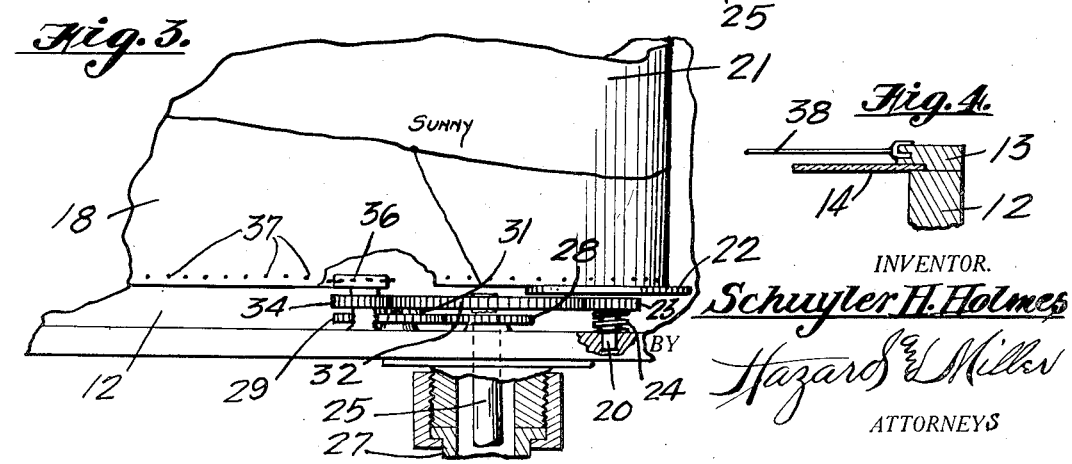
INVENTOR.
Schuyler H. Holmes
BY
Hazard & Miller
ATTORNEYS Patented Feb. 12, 1924.

1,483,728

UNITED STATES PATENT OFFICE.

SCHUYLER H. HOLMES, OF VENICE, CALIFORNIA.

LOCALITY INDICATOR FOR VEHICLES.

Application filed October 6, 1921. Serial No. 505,710.

*To all whom it may concern:*

Be it known that I, SCHUYLER H. HOLMES, a citizen of the United States, residing at Venice, in the county of Los Angeles and State of California, have invented new and useful Improvements in Locality Indicators for Vehicles, of which the following is a specification.

My invention relates to a locality indicator for vehicles, the principal objects of my invention being to provide a relatively simple and practical device that is adapted to be positioned within the vehicle at a point adjacent to the driver thereof, preferably upon the dash, and which device is equipped with means actuated from an operating part of the vehicle for imparting movement to a map, and which latter is mounted upon a flexible member that is adapted to unwind from one rolling support to wind on to another rolling support, and which map shows the roadway that is being traversed by the vehicle to which the device is applied.

The device contemplated by my invention is intended to serve as a combined road guide and map for a vehicle that is being driven from one point to another, and said device is intended to receive flexible maps that are made up and distributed among vehicle drivers, and particularly those making extended overland tours.

With the foregoing and other objects in view, my invention consists in certain novel features of construction and arrangement of parts that will be hereinafter more fully described and claimed and illustrated in the accompanying drawings, in which:

Fig. 1 is a top plan view of a locality indicator of my improved construction.

Fig. 2 is a vertical section taken approximately on the line 2—2 of Fig. 1.

Fig. 3 is a detail plan view partly in section, and which view is taken approximately on the line 3—3 of Fig. 2.

Fig. 4 is a cross section taken on the line 4—4 of Fig. 1.

Referring by numerals to the accompanying drawings which illustrate a practical embodiment of my invention, 10 designates a fixed part of my invention preferably the dash, and in which is formed the opening 11 that is adapted to receive my improved device.

The locality indicator includes a relatively shallow housing 12 that serves as a container for the operating parts of the device, and the top of said housing 12, is closed by a removable panel comprising a frame 13 in which is arranged a section 14 of glass or like transparent material.

Journalled in suitable bearings at one end of the housing 12, is a transversely disposed shaft 15, on which is loosely mounted a drum 16 provided at its end with flanges 17, and to which drum is detachably connected one end of a flexible member 18 of paper, fabric or the like, on the upper or outer face of which appears a road or locality map, and the latter being made up of data relating to a road or thoroughfare that is traversed by motor vehicles and the like.

Pivotally mounted within housing 12 adjacent to drum 16 is a spring pressed arm 19, the free end of which engages the periphery of one of the disks 17 thereby serving as a friction brake to restrict or retard the rotary motion of drum 16.

Journalled in suitable bearings in the opposite end of housing 12 is a transversely disposed shaft 20 on which is loosely mounted a drum 21 upon which the flexible map carrying member 18 is adapted to wind, and secured to the end of said drum 21 are disks 22.

Loosely mounted on shaft 20 is a pinion 23, and which latter is normally pressed against the adjacent end of drum 21 by a small expansive coil spring 24.

Journalled in a suitable bearing that is formed in the side wall of housing 12, adjacent to shaft 20, is a short shaft 25 to which is detachably connected one end of flexible shaft 26, and the latter being driven from an operating part of the vehicle, preferably one of the wheels thereof.

Flexible shaft 26 is preferably enclosed in a flexible tube 27, one end thereof being detachably connected to housing 12.

The inner end of shaft 25 carries a pinion 28, and the teeth thereof mesh with the teeth of a pinion 29, that is carried by a relatively short shaft 30 that is journalled in suitable bearings within housing 12.

Fixed on shaft 30 is a relatively small pinion 31, the latter meshing with a larger pinion 32 that is carried by a shaft 33 that is journalled in suitable bearings in the housing 12, and the teeth of said pinion 32 mesh with the teeth of the loosely mounted spring pressed pinion 23.

The teeth of pinion 32 also mesh with the teeth of a pinion 34, the latter being fixed to a shaft 35 that is journalled for rotation in suitable bearings in the housing 12, and the inner end of said shaft 35 carrying a spur wheel 36, the points of which are adapted to engage in suitably located apertures 37 that are formed in the adjacent edge of the flexible member 18.

Obviously the flexible shaft must be driven by a rotary member that bears direct relation to the distances traversed by the vehicle to which the device is applied, and as said flexible member is rotated, the rotary motion thereof will be transmitted through shaft 25 to pinion 28, thence to pinion 29, shaft 30 and pinion 31 to pinion 32, and from the latter to pinion 34 and spur wheel 36 that is carried by shaft 35 so that spur wheel 36 will slowly unwind the flexible map bearing member 18 from the drum 16 and draw said flexible member toward the drum 21.

As pinion 32 is rotated, its motion will be transmitted to pinion 23, and the latter being in frictional engagement with the end of roller 21, will rotate the latter so as to wind the flexible member 18 thereupon.

Inasmuch as the drum 21 is loosely mounted on shaft 20 said drum may rotate slightly, independently of the pinion 23, thereby compensating for the amount of the flexible member that is wound on to said drum, for as the winding movement continues, the roll or body of the flexible material that is wound on to said drum 21 gradually increases in diameter.

Arranged to slide longitudinally upon the frame 13, is a transversely disposed member 38, preferably of wire, which serves as an adjustable indicator or guide that is utilized in determining the position of the vehicle with respect to the marked point on the road map that appears on the face of member 16. This member 38 is arranged to slide so that it may be adjusted to compensate for any inaccuracy that may arise in the driving mechanism for the map bearing member 18.

Thus it will be seen that I have provided a relatively simple, practical and efficient device that may be advantageously utilized in connection with motor vehicles, and which will serve to indicate upon the map the exact locality of the vehicle upon the road that is being traversed, and which road, it will be understood, is fully delineated upon the map that is placed in the device.

It will be understood that minor changes in the size, form and construction of the various parts of my improved locality indicator, may be made and substituted for those herein shown and described without departing from the spirit of my invention, the scope of which is set forth in the appended claims.

I claim as my invention:

1. A locality indicator comprising a casing, a pair of shafts journaled in the casing, drums on the shafts, a flexible map carrying member trained about one of the drums and extending to the other drum, a gear loosely mounted on the shaft of the second mentioned drum, resilient means for normally urging the gear toward the drum so as to frictionally engage the latter, a shaft extending from the casing, and means for operatively connecting the last mentioned shaft with said gear.

2. A locality indicator comprising a casing, a pair of shafts journaled in the casing, drums on the shafts, a flexible map carrying member trained about one of the drums and extending to the other drum, a gear loosely mounted on the shaft of the second mentioned drum, resilient means for normally urging the gear toward the drum, a shaft extending from the casing, means for operatively connecting the last mentioned shaft with said gear, a spur wheel operable by the last means and disposed at a point between said drums, said map carrying member being provided with openings along one edge adapted to receive the spurs of said spur wheel for the purpose described.

3. A locality indicator comprising a casing, a pair of shafts journaled in the casing, drums on the shafts, a flexible map carrying member trained about one of the drums and extending to the other drum, a gear loosely mounted on the shaft of the second mentioned drum, a spring between the casing and gear for normally urging the latter toward the drum, a shaft extending from the casing, a train of gearing operatively connecting the last mentioned shaft with said gear, a spur wheel operable by the train of gearing and disposed at a point between said drums, said map carrying member being provided with openings along one edge adapted to receive the spurs of said spur wheel for the purpose described.

In testimony whereof I have signed my name to this specification.

SCHUYLER H. HOLMES.